(12) United States Patent
Kobuna et al.

(10) Patent No.: US 12,463,429 B2
(45) Date of Patent: Nov. 4, 2025

(54) POWER MANAGEMENT SYSTEM

(71) Applicant: TOYOTA JIDOSHA KABUSHIKI KAISHA, Toyota (JP)

(72) Inventors: Shunsuke Kobuna, Mishima (JP); Masato Ehara, Gotenba (JP); Yusuke Horii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 18/433,699

(22) Filed: Feb. 6, 2024

(65) Prior Publication Data

US 2024/0339838 A1     Oct. 10, 2024

(30) Foreign Application Priority Data

Apr. 6, 2023   (JP) ................................. 2023-062003

(51) Int. Cl.
*H02J 3/32*      (2006.01)
*B60L 53/68*     (2019.01)
*B60L 55/00*     (2019.01)
*H02J 3/00*      (2006.01)
*H02J 3/38*      (2006.01)

(52) U.S. Cl.
CPC .............. *H02J 3/322* (2020.01); *B60L 53/68* (2019.02); *B60L 55/00* (2019.02); *H02J 3/003* (2020.01); *H02J 3/004* (2020.01); *H02J 3/38* (2013.01)

(58) Field of Classification Search
None
See application file for complete search history.

(56) References Cited

U.S. PATENT DOCUMENTS

| | | | | |
|---|---|---|---|---|
| 2013/0184882 | A1* | 7/2013 | Momose ................. | B60L 53/68 700/286 |
| 2020/0231061 | A1* | 7/2020 | Kanamori ............... | H02J 3/322 |
| 2021/0021131 | A1* | 1/2021 | Hanayama ............... | H02J 3/38 |
| 2024/0001794 | A1* | 1/2024 | Gokhale ................. | B60L 53/63 |
| 2024/0204522 | A1* | 6/2024 | Seroff ..................... | H02J 3/322 |

FOREIGN PATENT DOCUMENTS

JP          2021-119727 A     8/2021

* cited by examiner

*Primary Examiner* — Rexford N Barnie
*Assistant Examiner* — Joel Barnett
(74) *Attorney, Agent, or Firm* — SoraIP, Inc.

(57) ABSTRACT

A power management system for managing at least one power generation system connected to an electrical grid and at least one energy storage device connected to the electrical grid, wherein the energy storage device is charged or discharged in a time period in which the reliability of the prediction of the amount of power generation and the power demand per time period is high based on a predicted amount of power generation which is an amount of power generation of the power generation system predicted for each time period and a predicted power demand which is a power demand for the electrical grid. Thus, more proper energy management can be performed.

2 Claims, 4 Drawing Sheets

POWER MANAGEMENT SYSTEM

CROSS-REFERENCE TO RELATED APPLICATION

This application claims priority to Japanese Patent Application No. 2023-062003 filed on Apr. 6, 2023, incorporated herein by reference in its entirety.

BACKGROUND

1. Technical Field

The present disclosure relates to power management systems.

2. Description of Related Art

Conventionally, a system configured to manage a power generation system (power supply unit) connected to an electrical grid and a plurality of energy storage devices (storage batteries) connected to the electrical grid (see, for example, Japanese Unexamined Patent Application Publication No. 2021-119727 (JP 2021-119727 A)) has been proposed as a power management system. This system predicts future supply-demand balance and keeps the states of charge (SOCs) of the energy storage devices at a reference SOC in advance based on the prediction result.

SUMMARY

In the above power management system, however, it is difficult to accurately predict the power demand and the power that is generated in the power generation system. If the prediction is wrong, it may not be possible to perform proper energy management. For example, the energy storage devices may be charged with the power from the electrical grid or the power may be discharged from the energy storage devices to the electrical grid even when the power generated in the power generation system actually exceeds the power demand.

A primary object of a power management system of the present disclosure is to perform more proper energy management.

The power management system of the present disclosure uses the following means in order to achieve the primary object.

The power management system of the present disclosure is configured to manage at least one power generation system connected to an electrical grid and at least one energy storage device connected to the electrical grid, and based on a predicted amount of power generation and a predicted power demand that are an amount of power generation of the power generation system and a power demand for the electrical grid predicted for each time period, charge or discharge the energy storage device during the time period for which reliability of prediction of the amount of power generation and the power demand is high.

The power management system of the present disclosure is configured to, based on the predicted amount of power generation and the predicted power demand that are the amount of power generation of the power generation system and the power demand for the electrical grid predicted for each time period, charge or discharge the energy storage device during the time period for which the reliability of prediction of the amount of power generation and the power demand is high. This reduces unnecessary charging and discharging between the electrical grid and the energy storage device. As a result, more proper energy management can be performed.

The power management system of the present disclosure may be configured to set a charge and discharge instruction amount of the energy storage device for each time period so as to minimize an accumulated value obtained by accumulating the charge and discharge instruction amount for each time period divided by the reliability, and may be configured to charge or discharge the energy storage device with the charge and discharge instruction amount set for each time period. The charge and discharge amount of the energy storage device for each time period can thus be set properly, so that more proper energy management can be performed.

In the power management system of the present disclosure, the reliability may be set lower for a predetermined time period than for a time period different from the predetermined time period, the predetermined time period being a time period determined in advance to be a time period in which the prediction of either or both of the amount of power generation and the power demand tends to be wrong. The reliability for each time period can thus be set more properly. It is therefore possible to properly set the time period during which the energy storage device is charged or discharged, so that more proper energy management can be performed.

In this case, the power generation system may be configured to generate power using renewable energy, and the predetermined time period may be at least one of the following time periods: a sunrise time period, a sunset time period, and a cloudy time period. It is typically difficult for the power generation system using renewable energy to predict power generation during the sunrise or sunset time period and the cloudy time period. Accordingly, the reliability for each time period can be set more properly by setting the predetermined time period to at least one of the following time periods: the sunrise time period, the sunset time period, and the cloudy time period. It is therefore possible to properly set the time period during which the energy storage device is charged or discharged, so that more proper energy management can be performed. Examples of the "renewable energy" include sunlight, solar heat, wind power, biomass, hydropower, geothermal heat, snow and ice heat, temperature difference, and ground source heat.

The energy storage device may be mounted on a vehicle, and the predetermined time period may be a time period in which the vehicle starts to travel. It is difficult to predict the time period in which the vehicle starts to travel, because that time period varies according to the situation of the user of the vehicle etc. Accordingly, the reliability for each time period can be set more properly by setting the predetermined time period to the time period in which the vehicle starts to travel. It is therefore possible to properly set the time period during which the energy storage device is charged or discharged, so that more proper energy management can be performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described with reference to an embodiment.

Figure 1:
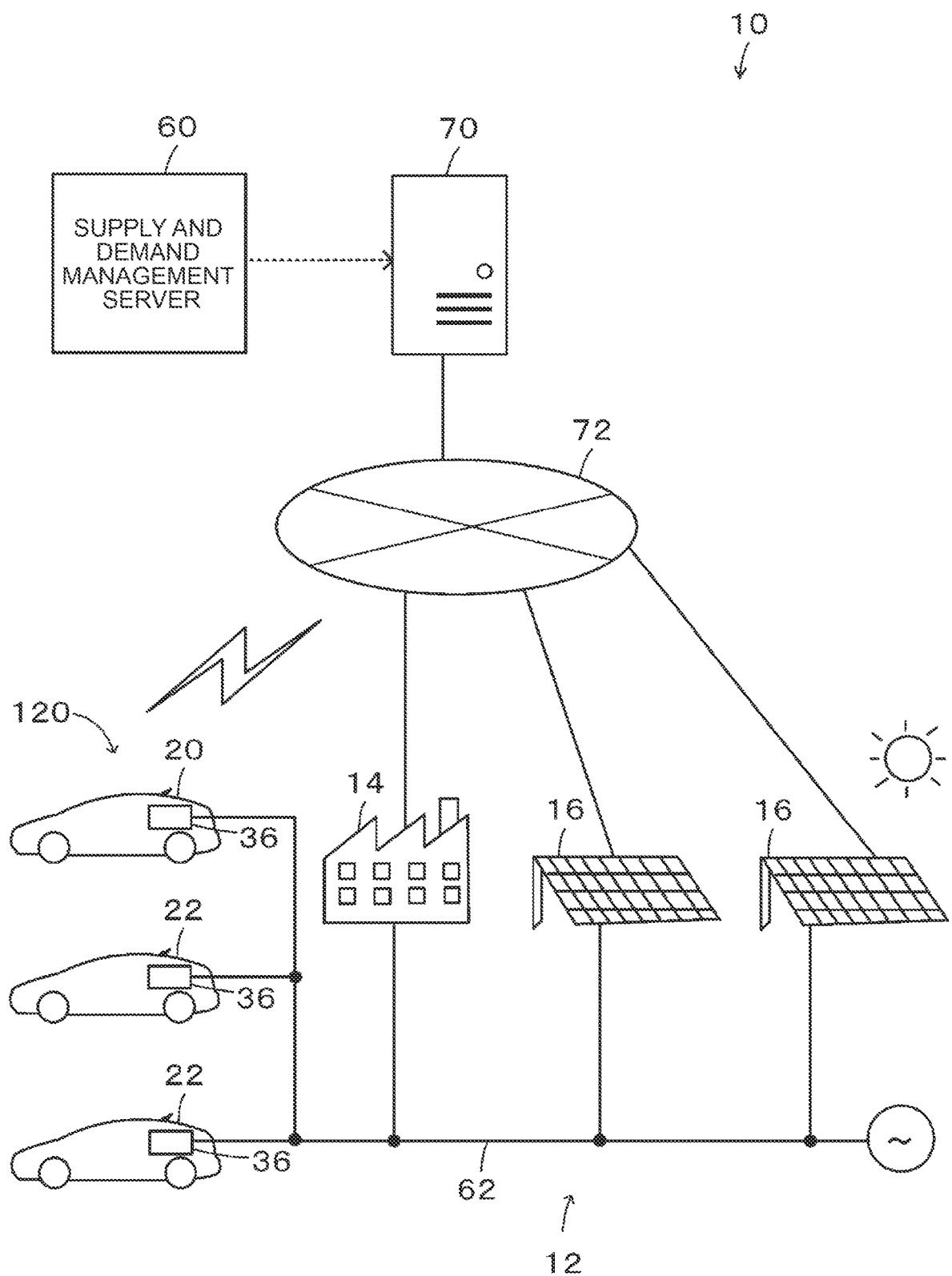
FIG. 1 is a configuration diagram illustrating an outline of a configuration of a supply-and-demand management system 10.

FIG. 1 is a configuration diagram illustrating an outline of a configuration of a supply-and-demand management system 10. The supply-and-demand management system 10 controls the distributed power supply system 12 owned by a customer such as a residence or a business operator to adjust the supply-and-demand balance of electric power, and includes, as shown, a supply-and-demand management server 60 and a power management device 70 incorporating the power management system of the embodiment.

The distributed power supply system 12 is connected to an electrical grid 62 provided by an electric power company, and may include, for example, a thermal power generation system 14 installed in a factory or the like as a power generation system, a power generation system 16 using renewable energy such as solar light, solar heat, wind power, biomass, hydroelectric power, geothermal heat, snow and ice heat, temperature difference, and geothermal heat, and a plurality of battery electric vehicles 20 equipped with a battery 36 as an energy storage device. Hereinafter, a plurality of battery electric vehicles 20 may be collectively referred to as a vehicle group 120.

Figure 2:
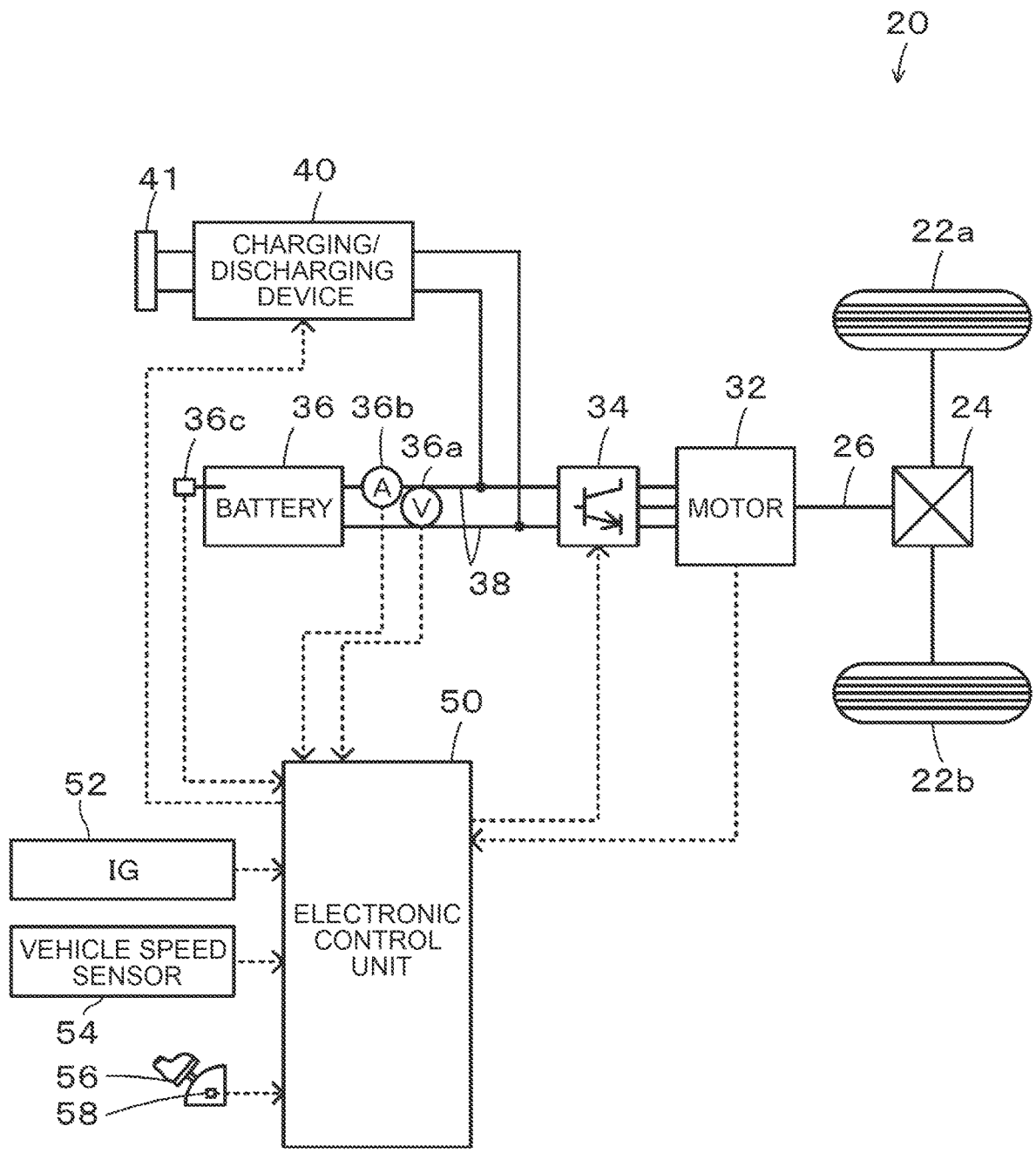
FIG. 2 is a configuration diagram illustrating an outline of a configuration of a battery electric vehicle 20.

FIG. 2 is a configuration diagram illustrating an outline of a configuration of a battery electric vehicle 20. As illustrated, each battery electric vehicle 20 includes a motor 32, an inverter 34, a battery 36 serving as an energy storage device, a charging/discharging device 40, and an electronic control unit 50.

The motor 32 is connected to a drive shaft 26 in which a rotor is connected to a drive wheel 22a, 22b via a differential gear 24. Inverter 34 is used to drive motor 32 and is connected to battery 36 via power line 38. The motor 32 is rotationally driven by switching control of a plurality of switching elements (not shown) of the inverter 34 by the electronic control unit 50. The battery 36 is configured as, for example, a lithium-ion secondary battery or a nickel-hydrogen secondary battery.

The charging/discharging device 40 is connected to the power line 38, and is configured to be capable of charging the battery 36 by electric power from the electrical grid 62 and discharging from the battery 36 to the electrical grid 62 when the system-side connector connected to the electrical grid (external power supply) 62 and the vehicle-side connector 41 are connected. The charging/discharging device 40 is controlled by the electronic control unit 50.

The electronic control unit 50 is configured as a microprocessor centered on a CPU (not shown), and includes a ROM for storing a process program, a RAM for temporarily storing data, an input/output port, and a communication port in addition to CPU. Signals from various sensors are input to the electronic control unit 50 via input ports. The signals inputted to the electronic control unit 50 include, for example, a rotational position Om of the rotor of the motor 32 from a rotational position sensor (not shown) that detects the rotational position of the rotor of the motor 32, a phase current Iu, Iv, Iw of each phase of the motor 32 from a current sensor (not shown) that detects a phase current of each phase of the motor 32, a voltage Vb of the battery 36 from a voltage sensor 36a attached between terminals of the battery 36, an input/output current Ib of the battery 36 from a current sensor 36b attached to an output terminal of the battery 36, and a temperature Tb of the battery 36 from a temperature sensor 36c attached to the battery 36. Examples include an ignition signal from the ignition switch 52, an accelerator operation amount Acc from the accelerator pedal position sensor 84 that detects a depression amount of the accelerator pedal 83, and a vehicle speed V from the vehicle speed sensor 54. Various control signals are output from the electronic control unit 50 via an output port. Examples of the signal output from the electronic control unit 50 include a control signal to the inverter 34 and a control signal to the charging/discharging device 40. The electronic control unit 50 calculates the amount of power Sb stored in the battery 36 and the state of charge SOC of the battery 36 based on the accumulated value of the input/output current Ib of the battery 36 from the current sensor 36b. Here, the state of charge SOC is a ratio of the capacity stored in the battery 36 to the total capacity of the battery 36. The electronic control unit 50 is configured to be capable of wirelessly communicating with the power management device 70.

In battery electric vehicle 20 configured as described above, the electronic control unit 50 sets the required torque Td* to the torque command Tm*, and performs switching control of the plurality of switching elements of the inverter 34 so that the motor 32 is driven by the torque command Tm*.

Further, in battery electric vehicle 20, when the vehicle-side connector 41 and the system-side connector are connected during parking, the electronic control unit 50 controls the charging/discharging device 40 so that the battery 36 is charged or discharged with the electrical grid 62, thereby causing the battery 36 to be charged or discharged.

The supply-and-demand management server 60 is installed in the electric power company, and when the shortage of the power supply amount of the electrical grid 62 is expected based on the power generation state of the electric power company, the future power generation plan, the present weather, the future weather forecast, the present power consumption, the future power consumption expected amount, etc., requests the electric power management device 70 to a DR for reducing the amount of electricity demand, and when the amount of electric power supply is expected to be excessive, requests the electric power management device 70 to DR the increase in the amount of electricity demand.

The power management device 70 manages the distributed power supply system 12. Although not shown, the power management device 70 is configured as a computer including a CPU, a ROM, RAM, and the like, and communicates with a plurality of battery electric vehicles 20 related to a contract via the network 72 by radio, or communicates with the thermal power generation system 14 and the power generation system 16 by wire or radio via the network 72. The power management device 70 sets a charge and discharge instruction including a charge and discharge instruction amount Wc* as a charge and discharge amount required for the vehicle group 120 for each time period. Then, based on the set charge and discharge instruction, charge and discharge planned values of the individual battery electric vehicle 20 are created and transmitted to the electronic control unit 50 of battery electric vehicle 20. The electronic control unit 50 of battery electric vehicle 20 charges and discharges the battery 36 based on the received charge and discharge plan.

Figure 3:
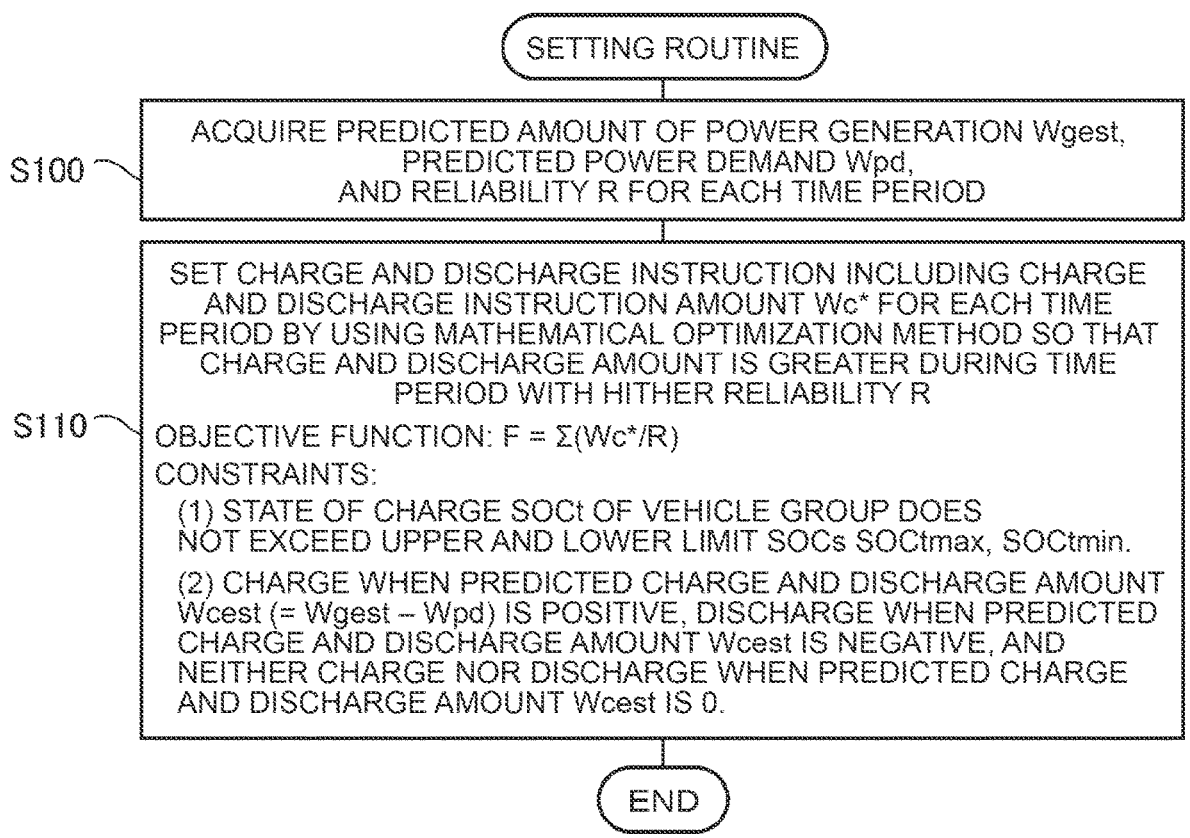
FIG. 3 is a flow chart showing an exemplary configuration routine executed by CPU of the power management device 70.
Figure 4:
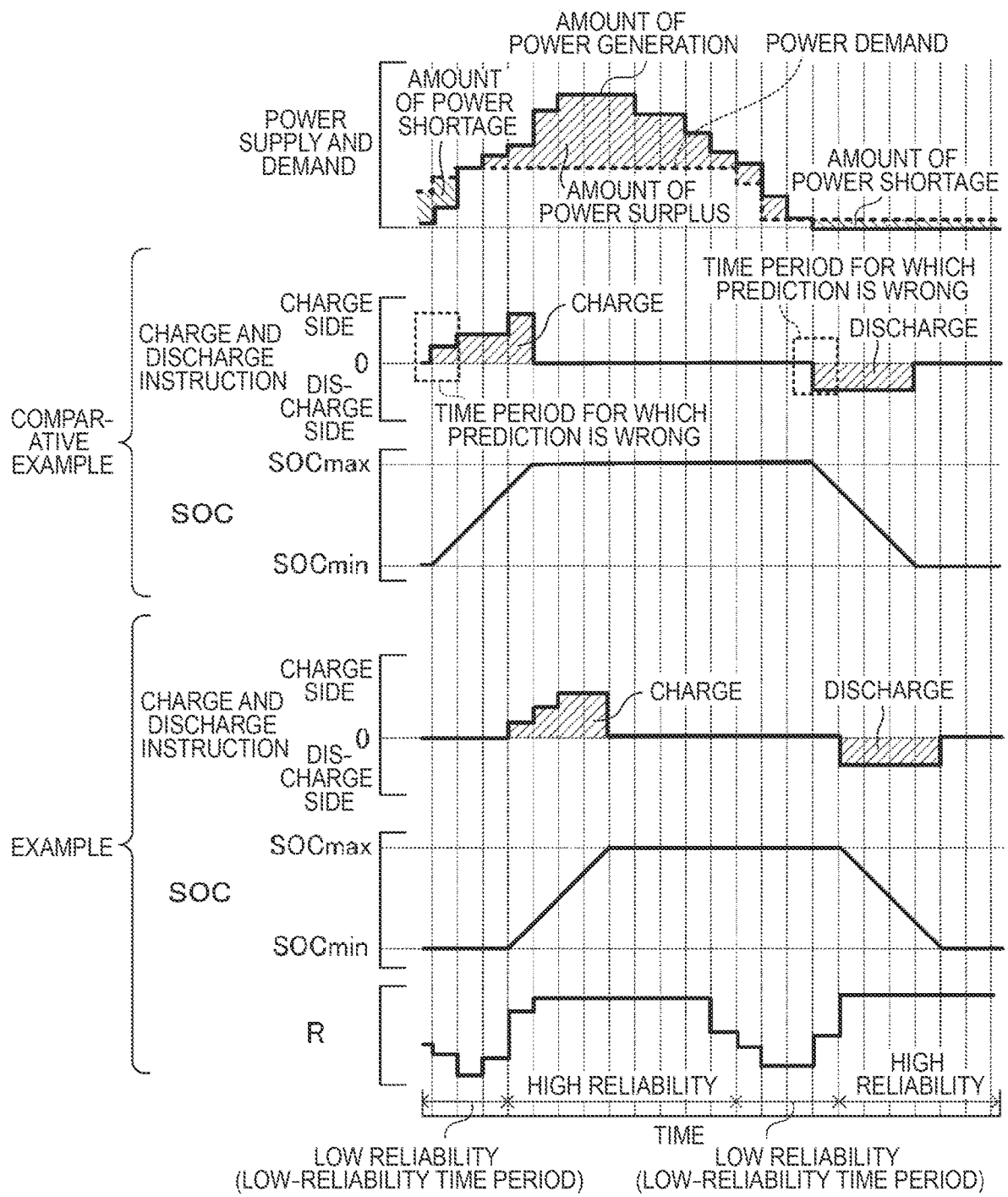
FIG. 4 is a timing chart illustrating an example of an amount of power generation in the distributed power supply system 12, a power demand of the electrical grid 62, a reliability R, and a charge and discharge instruction for each time period.

Next, the operation of the supply-and-demand management system 10 of the embodiment configured in this way, in particular, the operation when setting the charging and discharging instruction of the vehicle group 120 will be described. FIG. 3 is a flow chart illustrating an exemplary configuration routine executed by CPU of the power management device 70. FIG. 4 is a timing chart illustrating an example of the amount of power generation in the distributed power supply system 12, the power demand of the electrical grid 62, the reliability R, the charge and discharge instruction, and the state of charge SOCt in the vehicle group 120 (sum of states of charge SOCs of the batteries 36 in a plurality of battery electric vehicles 20) for each time period. In FIG. 4, for comparison, the charge and discharge instruction of the comparative example determined without considering the reliability R and the temporal change of the state of charge SOCt in the vehicle group 120 are shown as comparative examples. This routine is executed every predetermined time (e.g., 12 hours, 24 hours, 36 hours, etc.).

When this routine is executed, CPU of the power management device 70 executes a process of acquiring the predicted amount of power generation Wgest, the predicted power demand Wpd, and the reliability R for each time period (for example, every 30 minutes, every hour, and every one and a half hours) from the present time to a predetermined time (S100).

The predicted amount of power generation Wgest is a predicted value of the amount of power generation in the power generation system of the distributed power supply system 12. The predicted amount of power generation Wgest is set by determining in advance a first prediction relationship that is a relationship between the date, the weather, the temperature, and the amount of power generation of the distributed power supply system 12 for each time period, storing the first prediction relationship in a ROM, and deriving a corresponding amount of power generation from the stored first prediction relationship that is given the present date, the weather, and the temperature. The first prediction relationship is determined from data obtained in the past on the date, the weather and temperature for each time period, and the amount of power generation in the distributed power supply system 12 for each time period.

The predicted power demand Wpd is a predicted power demand in the electrical grid 62. The predicted amount of power generation Wgest is set by determining in advance a second prediction relationship, which is a relationship between the date, the weather, the temperature, and the power demand of the electrical grid for each time period, storing the second prediction relationship in a ROM, and deriving a corresponding power demand from the stored second prediction relationship in which the present date, the weather, and the temperature are given. The second prediction relationship is determined from data of the power demand of the electrical grid 62 for each day, time period, temperature, and time period acquired in the past.

The reliability R is the reliability of the prediction of the predicted amount of power generation Wgest and the prediction of the predicted power demand Wpd. As illustrated in FIG. 4, the reliability R is set to be lower than a time period different from the low reliability time period for a low reliability time period (predetermined time period) that is predetermined as a time period in which at least one of the prediction of the amount of power generation and the prediction of the power demand tends to be wrong. Examples of the low reliability time period include a sunrise time period that is a range of several hours including a sunrise time, a sunrise time period that is a range of several hours including a sunset time, a cloudy time period, and a time period in which a battery electric vehicle 20 starts to travel.

Subsequently, the charge and discharge instruction including the charge and discharge instruction amount Wc* for each time period is set by using the mathematical optimization method so that the charge and discharge amount in the time period where the reliability R is higher is increased (S110), and this routine is ended. In this mathematical optimization method, it is assumed that the constraint condition is that the state of charge SOCt of the vehicle group 120 does not exceed the upper and lower limit values SOCtmax, SOCtmin of the state of charge SOCt of the vehicle group 120 obtained by accumulating the upper and lower limit value SOCmax, SOCmin of the state of charge SOC of the battery 36 of each battery electric vehicle 20, and that the predicted charge and discharge amount Wcest obtained by subtracting the predicted power demand Wpd from the predicted amount of power generation Wgest is a positive value, the charge and discharge is performed when the value is a negative value, and the charge and discharge is not performed when the value is 0. Then, a value obtained by accumulating the charge and discharge instruction amount Wc* divided by the reliability R for each time period is used as an objective function, and the charge and discharge instruction amount Wc* for each time period is set so as to minimize the objective function. As a result, as illustrated in FIG. 4, the charge and discharge instruction amount Wc* can be set so that the charge and discharge amount increases in the time period in which the reliability R is higher. In the comparative example, for example, in FIG. 4, when the prediction of the predicted amount of power generation Wgest and the predicted power demand Wpd is wrong in portions surrounded by dashed lines, the battery 36 is charged or discharged with power from the electrical grid 62 during the time period. In the embodiment, since the charge and discharge amount is increased in the time period in which the reliability R is high, unnecessary charge and discharge of power between the electrical grid 62 and the battery 36 is suppressed, and more proper energy management can be performed.

According to the supply-and-demand management system 10 incorporating the power management system of the embodiment described above, it is possible to perform more proper energy management by charging and discharging the battery 36 in a time period in which the reliability R of the prediction of the amount of power generation and the power demand for each time period is higher based on the predicted amount of power generation Wgest and the predicted power demand Wpd for each time period.

The time period during which the battery 36 is charged or discharged and the charge and discharge instruction amount Wc* are set so as to minimize the accumulated value obtained by accumulating the charge and discharge instruction amount Wc* for each time period divided by the reliability R, and the battery 36 is charged or discharged by the charge and discharge instruction amount Wc* set for each time period. More proper energy management can thus be performed.

Further, the reliability R is set lower for a low reliability time period that is determined in advance to be a time period for which either or both of the prediction of the amount of power generation and the prediction of the power demand tends to be wrong than for a time period different from the predetermined time period. The time period during which the battery 36 is charged or discharged can thus be properly set, so that more proper energy management can be performed.

In this case, the power generation system 16 is a system that generates power using renewable energy, and the low reliability time period is set to at least one of the following time periods: a sunrise time period, a sunset time period, and a cloudy weather time period. More proper energy management can thus be performed.

The battery 36 is mounted on a vehicle, and the low reliability time period is set to a time period in which the battery electric vehicle 20 starts to travel. More proper energy management can thus be performed.

In the supply-and-demand management system 10 incorporating the power management system of the embodiment, the battery 36 as the energy storage device is mounted on battery electric vehicle 20, but the energy storage device may not be mounted on battery electric vehicle 20, and may be mounted on a hybrid electric vehicle capable of traveling power between the engine and the motor, or may be mounted on a moving body other than an automobile, such as a train or an airplane, or may be a stationary energy storage device that does not move.

In the supply-and-demand management system 10 incorporating the power management system of the embodiment, the setting routine illustrated in FIG. 3 is executed by CPU of the power management device 70, but at least one of the steps in the setting routine illustrated in FIG. 3 may be executed by CPU of the electronic control unit 50 mounted on battery electric vehicle 20.

The correspondence between the main elements of the embodiment and the main elements of the disclosure described in SUMMARY will be described. In the embodiment, the power management device 70 corresponds to a "power management system".

As for the correspondence between the main elements of the embodiment and the main elements of the disclosure described in SUMMARY, since the embodiment is an example for specifically describing a mode for carrying out the disclosure described in SUMMARY, the embodiment does not limit the elements of the disclosure described in SUMMARY. In other words, the interpretation of the disclosure described in SUMMARY should be performed based on the description in SUMMARY, and the embodiment is merely a specific example of the disclosure described in SUMMARY.

Although a mode for carrying out the present disclosure has been described above with reference to the embodiment, the present disclosure is not limited to the embodiment, and it goes without saying that the present disclosure can be carried out in various modes without departing from the gist of the present disclosure.

The present disclosure is applicable to a manufacturing industry of a power management system and the like.

What is claimed is:

1. A power management system comprising: a central processing unit (CPU) configured to:

for each of a predetermined plurality of time periods within a predetermined time range, acquire a predicted amount of power generation (Wgest) of a power generation system, acquire a predicted power demand (Wpd) of an electrical grid, acquire a reliability value (R) indicating a reliability of the predictions for Wgest and Wpd, acquire a current sum state-of-charge (SOCt) of batteries mounted on a plurality of vehicles, determine a charge-and-discharge instruction amount (Wc*) for each of the predetermined plurality of time periods, by utilizing a formula: an objective function F=Σ(Wc*/R) in constraints that the SOCt does not exceed an upper limit value (SOCtmax) or falls below a lower limit value (SOCtmin), which are determined by summing SOCtmax and SOCtmin of the batteries mounted on the plurality of vehicles, charge the batteries in a case where a predicted charge-and-discharge amount (Wcest)=Wgest−Wpd=positive, discharge the batteries in a case where the predicted charge-and-discharge amount (Wcest)=Wgest−Wpd=negative, and not to charge or discharge the batteries in a case where the predicted charge-and-discharge amount (Wcest) =Wgest−Wpd=0, such that the F is minimized, wherein the Wgest is determined in advance based on a first relationship between date, weather, temperature and the amount of power generation of the power generation system, the Wpd is determined in advance based on a second relationship between date, weather, temperature and the power demand for the electrical grid.

2. The power management system of claim 1, wherein the CPU is further configured to set the Wc* for each of the predetermined plurality of time period so that a larger charge-and-discharge amount is allocated to a time period having a higher R.

* * * * *